United States Patent [19]
Lederer

[11] 3,827,582
[45] Aug. 6, 1974

[54] STACKING DEVICE

[76] Inventor: George H. Lederer, 75 Gordon Rd., Willowdale, Ontario, Canada

[22] Filed: Dec. 13, 1971

[21] Appl. No.: 207,393

[52] U.S. Cl............ 214/7, 198/33 AC, 198/34, 214/8.5 SS, 214/340
[51] Int. Cl............................. B65g 47/24
[58] Field of Search............ 214/7, 8.5 F, 8.5 SS; 198/127, 33 AC, 35 A; 193/35 A

[56] References Cited
UNITED STATES PATENTS

| | | |
|---|---|---|
| 2,104,657 | 1/1938 | Bombard ............................ 214/7 |
| 2,345,310 | 3/1944 | Willoughby ....................... 214/7 X |
| 2,996,198 | 8/1961 | Packman .......................... 214/7 X |
| 3,127,029 | 3/1964 | Luginbühl ......................... 214/7 X |
| 3,130,967 | 4/1964 | Brell ................................. 214/7 X |
| 3,228,538 | 1/1966 | Coates ................................... 214/7 |
| 3,463,293 | 8/1969 | Lederer ...................... 198/33 AC |
| 3,497,086 | 2/1970 | Adams et al........................... 214/7 |

*Primary Examiner*—Robert G. Sheridan
*Attorney, Agent, or Firm*—Westell & Hanley

[57] ABSTRACT

Flat round articles are separated into stacks of known length by being stacked to a greater length against a stop and being divided out to a lesser length from the stop.

7 Claims, 5 Drawing Figures

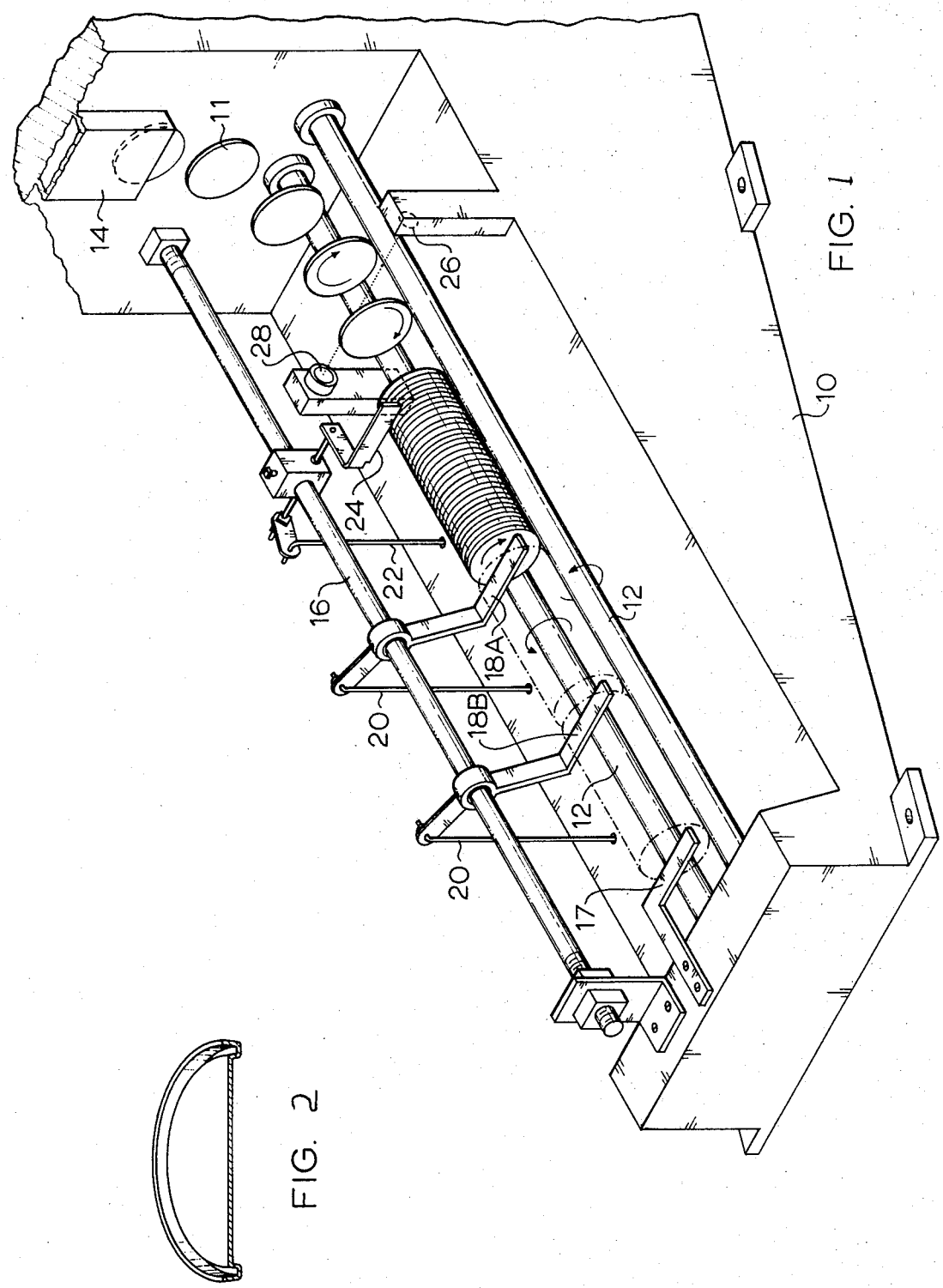

STACKING DEVICE

This invention relates to means for processing articles which are flat bodies of revolution.

By 'flat' in the disclosure and claims herein I mean (in relation to a body of revolution) an article whose axial dimension is small relative to the maximum diameter of its surface of revolution. The article however, may have non-planar surfaces on both sides of its axial extent, so that planar surfaces at such locations are not implied by the term 'flat.'

The invention deals with such articles when processed by being supported in an edgewise attitude while rotating on substantially parallel rollers and progressing axially along said rollers while so supported. Usually such movement will be due to gyro precession, as disclosed in my U.S. Pat. No. 3,463,293 which issued on the 26th of August 1969. Such progression may also partially or totally be due to the slope of the axes of the rollers.

The invention is useful with flat surfaces of revolution of many kinds. One of the principal uses is with flat circular plastic lids.

One object of the invention is to provide means and a method for providing for such flat circular articles, rotating edgewise on the substantially parallel cylindrical bars and progressing axially therealong; a stack of such articles of predetermined thickness or number.

Another object of the invention is to provide means and a method for providing for the axial travel of such flat circular articles while progressing axially therealong, which avoids the tendency of such articles to rotate to a degree which causes them to fall down or stop rotating.

In drawings which illustrate a preferred embodiment of the invention:

FIG. 1 shows a device in accord with the invention; and

FIG. 2 shows a portion of an aricle which would be processed by the invention.

Figure 3:
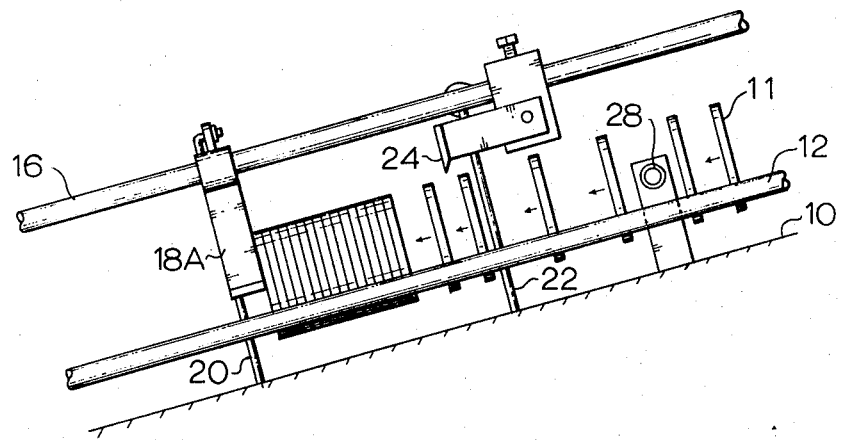
FIGS. 3–5 show the operation of the device.

In the drawings a sloping base 10 supports a pair of substantially parallel cylinrical rollers 12 driven to rotate, both in the same sense, by means not shown. The speed of rotation must be sufficient to cause the article to stand edgewise on the roller. The rollers 12 are axially preferably somewhat sloped as indicated. By "substantially parallel" in the disclosure and claims herein, it is meant that the rollers are sufficiently parallel that rotating circular flat articles of the type dealt with by the invention (such as the lid partially cut away in FIG. 2) may be supported by the rollers over the used axial extent of the latter.

At the upper end of the rollers, articles (here lids 11) are dropped edgewise onto the rollers from a chute 14. If the lids or other articles handled do not have a plane of symmetry perpendicular to their axis of revolutions, it will be necessary, for consistent gyro effects, that the lids all face the same way. This may be achieved, for feeding through the chute 14, in any of a number of ways well known to those skilled in the art, and in addition a method of aligning lids all in the same orientation, is disclosed in my U.S. Pat. No. 3,311,218 which issued on the 28th day of May, 1967.

The gyroscopic means by which the articles (here lids) will travel axially due to their asymmetry is discussed in my U.S. Pat. No. 3,463,293 which issued on the 26th day of August, 1969. Thus, as discussed in this patent, the lids must be placed edgewise on the rollers in the orientation which causes their movement in the correct direction along the roller, due to precession. Further, if a tilt is provided to the rollers as set out in the specific embodiment, to assist in the gyroscopic precession, then the article orientation should be selected so that its gyro precession augments rather than subtracts from the gyroscopic precession contributed by the tilt of the roller axes. Where the articles are symmetrical about a plane perpendicular to their axes of revolution, the tilt of the rollers must be relied on to contribute the gyroscopic precession.

The rollers 12 define an axial sense of progression for the articles from the upper to the lower end of the rollers. Parallel to the direction of the roller axes, there is provided a bar 16. At the lower end there is provided a stationary stop 17 to stop articles progressing in the desired sense along the rollers. At intervals therefrom toward the chute, with the interval length corresponding to the length of stack desired, there is provided a series of removable stops in the form of bars 18 to interrupt the travel toward the lower end of lids progressing along the rollers. These stop bars 18 are freely pivotally mounted on bar 16 and designed as bell cranks to be controlled by the links 20 pivotably connected to the ends of the cranks remote from the bars 18, with the links connected at their other ends to control means, not shown.

Also freely pivotally mounted on bar 16 and of bell crank design controlled by link 22 pivotted thereto, is a blade 24, shaped in whichever manner will best separate adjacent articles of the type being stacked when brought into contact therewith. The blade is designed to be normally out of contact with the articles moving on said rollers but movable into contact therewith under control of the link 22. The normal attitude of the movable stop bars 18 is the path of travel of the lids along the bars while the blade 24 is normally out of the path of the lids.

As will be apparent from the description hereafter, the distance between the divider blade 24 and the first stop bar 18A in the down-travel direction determines the length of a stack. Hence the axial distance between adjacent stop bars 18 will preferably be just greater than the intended stack length (as shown). Between the divider blade 24 and the chute there is provided a sensor to the presence of articles (here a photocell 26) oppositely disposed from a light source 28 across the lid travel path. A control circuit, not shown, but well known to those skilled in the art (connected to receive the photocell response) is provided to ignore temporary interruptions of the photocell response caused by the passage of single articles or small groupings of articles progressing down the bars, but to provide an output signal upon the presence of an interruption of the light path for longer than a predetermined time interval. Thus the existence of a stack extending from the first stop bar 18A to an extent in the uptravel direction farther than the photocell (see FIG. 4) will actuate the control circuit, to cause the production of an output signal therefrom.

The control means, on receipt of such output signal is designed to operate link 22 to move the divider 24 between adjacent articles (FIG. 4) so that the stack length is determined, as the articles stacked between the first stop bar 18A and the blade 24. Thus the blade 24 has divided the stack into two portions (the rollers continuing to rotate throughout) with the first portion being the defined stack depth, between the stop bar 18A and the blade 24, and the second portion being the growing stack between the blade 24 and the article incidence location under the chute. Thus both stack portions and lids progressing toward the second stack portion continue to rotate. Also, as shown in FIG. 5 the blade 24 preferably moves the residue (after dividing out the stack) against the normal travel direction, a distance sufficient that the stack, to the left of the blade in FIG. 5 may be lifted out by the fingers or mechanical lifting means between the stack and the residue, in the space created by blade 24 and with the other hand at the left hand end of the stack.

On the other hand, it is noted that the knife will under the simplest of the available control systems, be designed so that it does not move the residual lids, divided out from the stack, upstream past the cell. This is to avoid the possibility of the premature measuring of the existence of a stack. Such premature measurement might occur when the control was reset if the blade moved the residuary stack far enough back that the cell path was cleared, followed by the reactivation of the blade as the residue again passed forwardly past the cell.

Although provision may be made, as above, for manual removal of a divided-out stack, the common procedure will be to mechanically treat the stacks and the description will follow as if the stacks were mechanically rather than manually handled.

At the same time as the blade 24 divides the stack into portions (or just after) the stop means 18A and the other stop means are raised by the links 20 clear of the path of the articles along the bars. (This is under control of the same system controlling the blade 24). Thus the first portion of the articles, a stack of defined length, moves past the stop bar 18A as the blade 24 retains the second portion of the stack (see FIGS. 4 and 5).

Figure 4:
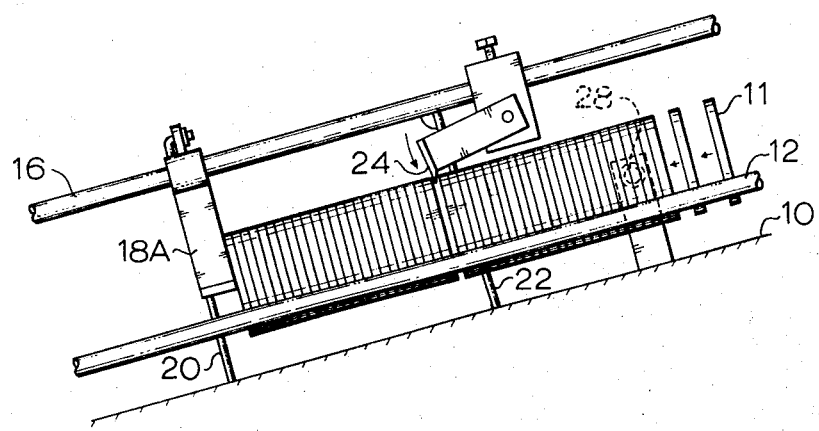
Figure 5:
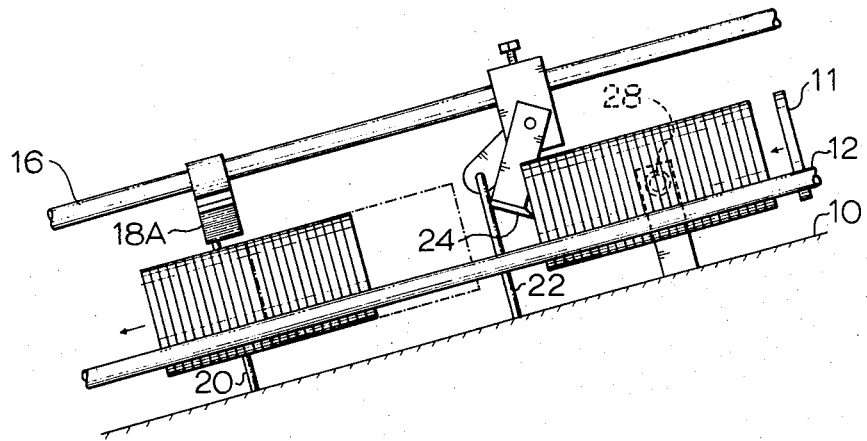

By sensing means or timing, the passage of the first stack portion past stop 18A (at the same time as lower stacks are passing a lower stop 18B formerly holding them), is allowed to occur; after which the bars 18A and 18B are caused, by the control, to move back to their former position to stop the first stack portion at the bar 18B and to raise the divider 24, not shown, to allow the residue divided and moved backwardly by the blade 24 in FIGS. 4 and 5, to move downwardly to start a new stack at bar 18A.

It has been found that an adjustable timing control may be provided for determining the necessary up-time of the stop bars 18 to allow passage of a first stack portion dispensing with the need for sensing means to determine the passage of a first stack portion past stop bar position.

It will be noted that the sensing of the stack extent may be performed by different sensing means than the photocell.

When the released second portion of an original stack is stopped by bar 18A, the stack will build up until the photocell is again actuated and the previously described cycle repeated. The process may be continued until all the stack spaces are filled and all stacks removed at once (by means not shown) or the stacks may be progressively moved as they reach the lowest position.

I claim:
1. Means for providing a stack of predetermined length of articles, said articles having the shape of flat surfaces of revolution, wherein there are provided substantially parallel cylindrical bars rotating in the same sense and arranged to support such bodies while the latter are rotating edgewise thereon, and wherein said articles and bars are designed and arranged so that such articles deposited edgewise at a predetermined location on said bars will tend to move longitudinally thereon; comprising:
   a defined extent on said bars, extending from said deposit location, said bodies being allowed to move longitudinally relative to said bars along said extent;
   stop means for terminating said longitudinal travel and defining the end of said extent remote from said predetermined location;
   said stop means allowing said rotation to continue, whereby a series of lids deposited on said bars, progressively stack from said stop means, in the opposite direction to said travel direction, along said bars, while rotating thereon;
   sensing means for determining when said stack has reached a predetermined depth;
   means responsive to said determination for separating said depth of stack into a lesser predetermined depth portion measured from said stop means, while allowing continued rotation of articles on the bars.

2. Means as claimed in claim 1 including means, responsive to said determination for removing said stop means for an interval to allow the articles in said lesser predetermined thickness to pass axially along said rollers.

3. Means as claimed in claim 2 including means for replacing said stop means in the path of axial travel of said articles after the passage of the articles in said lesser predetermined portion, secondary stop means preventing axial travel of the remainder of said stack axially along said rollers during the passage of said predetermined depth portion past said stop means.

4. Means as claimed in claim 3 including means for removing from the path of said articles, said secondary stop means, at a time when said articles, released thereby for continued axial travel, will have their axial travel stopped by said stop means.

5. Means for processing articles which are flat surfaces of revolution comprising:
   a pair of substantially parallel rollers rotating in the same sense;
   means, at a predetermined location along the axial extent of said rollers, for stopping the progression in one sense in said axial direction of articles which are flat bodies of revolution supported on and rotated by said rollers;
   said stop means allowing the rotation of said articles on said rollers to continue;
   means responsive to the existence of a stack of such articles of predetermined length, measured longitudinally along said rollers in the opposite to said progression direction, for dividing said stack into two portions.

6. Means, as claimed in claim 5, including means for removing the stop means to allow the one of said portions, nearest the stop means, to pass said stop means while preventing axial travel of the other of said portions.

7. Means as claimed in claim 6, including means operable after the passage, by said one portion of said stop means, to replace said stop means and to allow axial travel of the other of said portions.

* * * * *